United States Patent
Last et al.

(10) Patent No.: US 10,173,633 B2
(45) Date of Patent: Jan. 8, 2019

(54) HYBRID INFLATOR AND VEHICLE SAFETY SYSTEM COMPRISING SAID HYBRID INFLATOR AS WELL AS METHOD OF FORMING A SHOCK WAVE

(71) Applicant: TRW Airbag Systems GmbH, Achau am Inn (DE)

(72) Inventors: Detlef Last, Mühldorf (DE); Lorenz Seidl, Rechtmehring (DE); Rolf Ruckdeschel, Heldenstein (DE)

(73) Assignee: TRW Airbag Systems GmbH (DE)

( * ) Notice: Subject to any disclaimer, the term of this patent is extended or adjusted under 35 U.S.C. 154(b) by 0 days.

(21) Appl. No.: 15/368,778

(22) Filed: Dec. 5, 2016

(65) Prior Publication Data

US 2017/0166162 A1 Jun. 15, 2017

(51) Int. Cl.
| | |
|---|---|
| *B60R 21/272* | (2006.01) |
| *B60R 21/274* | (2011.01) |
| *B60R 21/264* | (2006.01) |
| *B60R 22/195* | (2006.01) |

(52) U.S. Cl.
CPC .......... *B60R 21/272* (2013.01); *B60R 21/264* (2013.01); *B60R 21/274* (2013.01); *B60R 22/1954* (2013.01); *B60R 2021/2642* (2013.01)

(58) Field of Classification Search
CPC .............. B60R 21/264; B60R 21/2644; B60R 21/2646; B60R 21/272; B60R 21/274; B60R 2021/2642; B60R 2021/2648; B60R 22/1954; B60R 22/1955
See application file for complete search history.

(56) References Cited

U.S. PATENT DOCUMENTS

| | | | | |
|---|---|---|---|---|
| 5,016,914 A | * | 5/1991 | Faigle | B60R 21/272 |
| | | | | 102/202.5 |
| 5,615,912 A | * | 4/1997 | O'Loughlin | B60R 21/272 |
| | | | | 102/531 |
| 5,660,412 A | * | 8/1997 | Renfroe | B60R 21/272 |
| | | | | 280/737 |

(Continued)

FOREIGN PATENT DOCUMENTS

| | | |
|---|---|---|
| DE | 102011013545 | 0/2012 |
| DE | 102004054788 | 2/2007 |

*Primary Examiner* — Laura Freedman
(74) *Attorney, Agent, or Firm* — Tarolli, Sundheim, Covell & Tummino LLP

(57) ABSTRACT

The invention relates to a hybrid inflator (10) includes at least one combustion chamber (15) in which propellant charge is arranged and which has a discharge end (20), the propellant charge being formed of at least one propellant element (26), at least one igniting unit (12) by which the propellant charge can be ignited. The hybrid inflator (10) also includes at least one bursting element (14, 14', 14") which in the inactivated state of the hybrid inflator (10) delimits the combustion chamber (15) against a gas supply chamber (16) at the discharge end (20). The bursting element (14, 14', 14") and a restraint element (18, 18', 18") maintain the propellant charge in its position and/or the bursting element (14, 14', 14") and the propellant charge delimit a shock gas volume (SGV), wherein in the activated state of the hybrid inflator (10) the shock gas volume (SGV) acts on the bursting element (14, 14', 14") like a gas pressure spring.

20 Claims, 3 Drawing Sheets

(56) References Cited

U.S. PATENT DOCUMENTS

| | | | | |
|---|---|---|---|---|
| 5,732,972 A * | 3/1998 | Johnson | | B60R 21/272 102/531 |
| 5,890,735 A * | 4/1999 | Smith | | B60R 21/272 102/531 |
| 5,964,479 A * | 10/1999 | Rink | | B60R 21/264 280/736 |
| 5,979,936 A * | 11/1999 | Moore | | B60R 21/261 280/736 |
| 6,237,950 B1 * | 5/2001 | Cook | | B60R 21/264 102/531 |
| 6,314,889 B1 * | 11/2001 | Smith | | B60R 21/2644 102/530 |
| 6,368,431 B1 * | 4/2002 | Mangum | | C06B 45/10 102/530 |
| 6,786,507 B2 * | 9/2004 | Dolling | | B60R 21/272 137/68.19 |
| 7,134,689 B2 * | 11/2006 | Matsuda | | B60R 21/261 280/736 |
| 7,252,303 B2 * | 8/2007 | Katsuda | | B21D 41/045 280/736 |
| 7,325,829 B2 * | 2/2008 | Kelley | | B60R 21/272 280/736 |
| 7,360,787 B2 * | 4/2008 | Englbrecht | | B60R 21/272 280/736 |
| 7,360,788 B2 * | 4/2008 | Yano | | B60R 21/272 280/737 |
| 7,363,863 B2 * | 4/2008 | Engler | | B60R 21/2644 102/530 |
| 7,413,217 B2 * | 8/2008 | Nakayasu | | B60R 21/272 280/737 |
| 7,527,291 B2 * | 5/2009 | Young | | B60R 21/268 280/737 |
| 7,828,324 B2 * | 11/2010 | Herget | | B60R 21/272 280/737 |
| 7,987,792 B2 * | 8/2011 | Jung | | C06D 5/02 102/200 |
| 8,052,169 B2 * | 11/2011 | Yano | | B60R 21/272 280/737 |
| 8,136,452 B2 * | 3/2012 | Asanuma | | B60R 21/272 102/530 |
| 8,651,520 B2 * | 2/2014 | Jung | | B60R 21/272 280/737 |
| 8,783,188 B1 * | 7/2014 | Mayville | | B60R 21/26 102/530 |
| 9,205,802 B1 | 12/2015 | Lang et al. | | |
| 2005/0146123 A1 * | 7/2005 | Bergmann | | B60R 21/272 280/741 |
| 2005/0236821 A1 * | 10/2005 | Hofmann | | B60R 21/268 280/737 |
| 2005/0280251 A1 * | 12/2005 | Yano | | B60R 21/272 280/736 |
| 2008/0023948 A1 * | 1/2008 | Kitayama | | B60R 21/272 280/736 |
| 2008/0069740 A1 | 3/2008 | Kitayama et al. | | |
| 2008/0111358 A1 * | 5/2008 | Jackson | | B60R 21/276 280/741 |
| 2015/0158455 A1 | 6/2015 | Ruckdeschel et al. | | |
| 2017/0028964 A1 * | 2/2017 | Bierwirth | | B60R 21/26 |
| 2017/0259775 A1 * | 9/2017 | Bierwirth | | B60R 21/2644 |

* cited by examiner

HYBRID INFLATOR AND VEHICLE SAFETY SYSTEM COMPRISING SAID HYBRID INFLATOR AS WELL AS METHOD OF FORMING A SHOCK WAVE

BACKGROUND OF THE INVENTION

The invention relates to a hybrid inflator composing at least one combustion chamber in which a propellant charge is arranged and which includes a discharge end, the propellant charge being formed of at least one propellant element, in accordance with the preamble of claim 1. Furthermore, the invention relates to a vehicle safety system comprising said hybrid inflator. The invention also relates to a method of forming a shock wave.

A hybrid inflator of the afore-mentioned type is known, for example, from DE 10 2013 018 886 A1. A bursting membrane divides the shown inflator housing into a combustion chamber and a gas supply chamber. The gas supply chamber is filled with gas, especially cold gas such as argon, helium or any other suitable gas mixture, and is closed to be pressure-tight by a bursting disk on the inflator end side. When activating the inflator, the igniter receives an electric signal to activate the same and, resp., to ignite the propellant. The ignition of the propellant provided in the combustion chamber results in sudden pressure increase in the combustion chamber so that the bursting membrane is destroyed or is abruptly opened and a large opening related to the diameter of the housing is formed in the bursting membrane. This abrupt opening generates a shock wave entering the gas supply chamber and passing through the same up to the bursting disk, with the bursting disk being opened.

The shock wave formed by opening the bursting membrane is intended to safeguard robust opening of the end-side bursting disk. In order to always achieve this with particular designs of hybrid inflators the measure so far has been to increase the combustion chamber pressure by increasing the bursting pressure of the bursting membrane. The shock wave generated in this way is sufficient to open also large hybrid inflators, for example. This requires massive reinforcement of the combustion chamber wall thicknesses, however, which have to be designed in accordance with a higher combustion chamber pressure. In the case of inflators in which the igniting unit initiates the shock wave, the pressures in the igniter chamber thus have to be appropriately high so as to generate a robust shock wave. This can be achieved by increasing the amount of propellant charge and/or also by highly charged igniters which themselves include an increased amount of pyrotechnics already and thus are very expensive.

SUMMARY OF THE INVENTION

It is the object of the invention to state a hybrid inflator in which both expensive igniters and very high combustion chamber pressures may be dispensed with, wherein a stable shock wave is to be generated in the hybrid inflator so that an inflator end-side bursting disk may be opened in a robust way.

It is another object of the invention to state a vehicle safety system comprising such hybrid inflator. Furthermore, the invention is intended to provide a method of forming a shock wave.

This object is achieved with respect to the hybrid inflator by the subject matter of claim 1 or 2, with respect to the vehicle safety system by the subject matter of claim 10 and with respect to the method by the subject matter of claim 11.

The invention is based on the idea to provide a hybrid inflator, especially for an airbag of a vehicle. The hybrid inflator includes at least one combustion chamber in which a propellant charge is arranged and which has a discharge end, wherein the propellant charge is formed of at least one propellant element. Further, the hybrid inflator comprises at least one igniting unit by which the propellant charge can be ignited. Moreover, the hybrid inflator comprises at least one bursting element that delimits the combustion chamber at the discharge end in the inactivated state of the hybrid inflator against a gas supply chamber. According to the invention, the bursting element and a restraint element maintaining the propellant charge in its position and/or the bursting element and the propellant charge delimit a shock gas volume which in the activated state of the hybrid inflator acts on the bursting element like a gas pressure spring.

The idea of the invention substantially is to form and, resp., to delimit a shock gas volume spatially ahead of the bursting element so that said shock gas volume is sized so as to press on the bursting element upon activation of the hybrid inflator. The shock gas volume is understood to be such gas package which is and, resp., will be initially biased upon activation of the hybrid inflator and subsequently due to the bias acts on the bursting element so that upon bursting of the bursting element such a stable shock wave is formed which may flow into the gas supply chamber and may robustly open a bursting disk provided on the end side of the gas supply chamber or, resp., a bursting element provided on the end side of the gas supply chamber. The shock wave intensity is increased, because a sufficiently large shock gas volume is formed ahead of the bursting element.

By way of example, this has to be understood in such way that by a shock gas volume formed ahead of the bursting element a large shock gas volume can be converted into a "shock wave mode" so as to form a more intense shock wave and, resp., a shock wave package so that the bursting disk provided on the end side of the gas supply chamber can be opened more easily and more robustly, i.e. at higher pressure. The shock gas volume created ahead of the bursting element situated between the combustion chamber and the gas supply chamber thus acts like a gas pressure spring.

The gas supply chamber is filled with gas, especially cold gas such as e.g. argon, helium or any other suitable gas mixture. It is possible that the bursting element does not close the gas supply chamber against the combustion chamber in a pressure-tight manner so that there is flow communication between the gas supply chamber and the combustion chamber. For this reason, during manufacture of the hybrid inflator upon filling the gas supply chamber with gas, especially cold gas, said gas flows via through holes in the area of the bursting membrane also into the combustion chamber, until pressure compensation has been reached between the combustion chamber and the gas supply chamber. Preferably, the pressure compensation is brought about within approx. 5 seconds. Prior to activating the hybrid inflator, compressed gas, especially cold gas, may thus be provided both in the gas supply chamber and in the combustion chamber in mutual flow communication. Another embodiment of the invention enables the propellant charge in the combustion chamber to be under atmospheric pressure. In this case the propellant charge is not surrounded by pressure gas of the biased gas supply chamber.

In the present case of the invention, a delimitation of a shock gas volume is to be understood as delimitation that is both gas-tight and not gas-tight toward the gas supply chamber. This area of the shock gas volume is kept free from propellant charge and free from individual propellant elements. With the aid of the bursting element and the restraint element maintaining the propellant charge in its position and/or with the aid of the bursting element and the propellant charge, in the combustion chamber of the hybrid inflator a space in which a shock gas volume is formed is created. Hence a sufficiently large amount or mass of shock gas is provided ahead of the bursting element.

According to the invention, the hybrid inflator may also be designed so that the bursting element includes an opening area by which a shock wave can be generated, wherein the propellant charge is arranged between the opening area and the igniting unit so that a free space, especially a shock gas volume, is formed which is free from propellant charge and has an axial length (in parallel to the longitudinal hybrid inflator axis L) of at least 9 mm, preferably of at least 15 mm, especially preferred of at least 25 mm and further especially preferred of at least 40 mm.

The ratio of the shock gas volume (SGV) to the total empty volume of the combustion chamber (BKV) is at least 0.25, preferably 0.35, especially preferably 0.45. In other words, it applies S6V/BKV≥0.25. In other words, the shock gas volume amounts to at least 25% of the total empty volume of the combustion chamber. The empty volume of the combustion chamber is to be understood the volume of the combustion chamber without any combustion chamber fittings and without any propellant charge present in the combustion chamber.

The propellant charge may include propellant tablets and/or propellant rings. The use of propellant tablets offers the advantage that between the individual propellant tablets a comparatively large volume is retained which can be filled by pressure gas or atmospheric gas. As compared to this, when using propellant rings a higher volume and, resp., a higher mass of propellant may be accommodated in the combustion chamber.

The hybrid inflator may include an external housing having a constriction which is formed between the combustion chamber and the gas supply chamber, the bursting element, which is especially designed as a bursting sleeve being inserted in the constriction. Preferably the external housing of the hybrid inflator is an elongate tubular housing. In said tubular housing both the combustion chamber and the gas supply chamber are formed. The separation between the combustion chamber and the gas supply chamber is effectuated by way of the bursting element. Said separation may be formed as being not pressure-tight or as being in fluid communication, however, so that e.g. the bursting element may include overflow passages axially extending on its outside so that already in a non-activated situation of the hybrid inflator a pressure compensation may exist from the combustion chamber toward the gas supply chamber as well as in the opposite direction.

In addition, the external housing may include a constriction or, resp. a notch so that the combustion chamber and the gas supply chamber are formed to be delimited against each other at least in portions, wherein a gas flow from the combustion chamber into the gas supply chamber is realized by a burst bursting element in the activated state of the hybrid inflator.

The bursting element may be in the form of a bursting sleeve and/or bursting membrane and/or bursting disk. If the bursting element is a bursting sleeve, said bursting sleeve may be inserted into the constriction. Preferably, the bursting element projects from the combustion chamber into the gas supply chamber in the longitudinal hybrid inflator axis, especially through the constriction. For this purpose, a peripheral wall of the bursting element may be adjacent at least in portions to the constriction, with a further part of the peripheral wall of the bursting element projecting into the gas supply chamber, i.e. being inserted in the gas supply chamber in the longitudinal direction of the hybrid inflator starting from the combustion chamber. Due to the configuration of said bursting element, the shock gas volume may be increased with respect to the known state of the art. Moreover, when the bursting element is in the form of a bursting sleeve, the shock gas volume flows more quickly into the gas supply chamber upon activation of the hybrid inflator, as part of the shock gas volume already is in the inactivated state in the area of the gas supply chamber. In other words, part of the shock gas volume is formed already level with the gas supply chamber and is delimited against the gas supply chamber merely by the lid of the bursting element and/or a portion of the peripheral wall of the bursting element. The shock gas volume thus may flow more quickly through the gas supply chamber.

In an embodiment of the invention, the restraint element may be in the form of a combustion chamber screen comprising especially a universal ball joint-shaped portion which is connected to a peripheral wall especially on the combustion chamber side. The combustion chamber screen may be completely adjacent to the inside of the bursting element, for example. The restraint element preferably takes substantially the shape of a cap. The curvatures of the combustion chamber screen and of the bursting element are formed to be preferably opposed to each other. Between the combustion chamber screen and the bursting element which is preferably in the form of a bursting sleeve the shock gas volume is formed.

The combustion chamber screen may include a peripheral wall arranged in the combustion chamber. The peripheral wall may have a hollow-cylindrical portion and/or a hollow truncated portion and/or a hollow truncated pyramid portion. In other words, the peripheral wall serves as an extension of a universal ball joint-type portion of the combustion chamber screen in the direction of the bursting element. The peripheral wall may be adjacent at least to portions of the bursting element. The peripheral wall allows the shock gas volume to be increased.

The peripheral wall may have such longitudinal extension which corresponds to at least the longitudinal extension of a/the universal ball joint-type portion, preferably to 1.2 to 2.5 times, especially to 1.5 to 2.0 times, the longitudinal extension of a/the universal ball joint-type portion. Longitudinal extension of the peripheral wall is understood to be the extension of the peripheral wall in the longitudinal direction of the hybrid inflator. The longitudinal extension of the universal ball joint-type portion of the combustion chamber screen, too, is the expansion or extension of the universal ball joint-type portion in the longitudinal direction of the hybrid inflator.

The combustion chamber screen preferably is made of metallic material so that the propellant charge, especially the at least one propellant element, can be fixed in its position in the combustion chamber. Preferably it is such metallic material that resists the heat upon activation of the hybrid inflator. The combustion chamber screen prevents the at least one propellant element from entering the shock gas volume.

In an alternative or additional embodiment of the invention the restraint element may be a hollow-cylindrical or hollow-conical screen, especially a spring, preferably a coil spring. Such spring causes an additional volume passage inside the propellant charge to be kept free. This volume passage formed inside the propellant charge makes available part of the shock gas volume. In this embodiment of the invention, at least the spring and the bursting element delimit a shock gas volume. In addition, in this embodiment of the invention a combustion chamber screen may be formed inside the combustion chamber. If the restraint element is a spring, the bursting element may be both a bursting membrane and a bursting sleeve.

One end of the spring may be arranged in the bursting element. In this case the end of the spring is supported by the bursting element. If the bursting element is a bursting sleeve, the end of the spring may be adjacent to the inner surface of a peripheral wall of the bursting sleeve.

In another or alternative embodiment, the at least one propellant element may be in the form of plural propellant rings, the propellant rings being arranged so that they constitute a passage delimiting at least in portions the shock gas volume. The propellant rings are juxtaposed in the longitudinal extension of the combustion chamber so that the openings of the propellant rings form a passage. The arrangement of the individual propellant elements and the bursting element in this embodiment delimit the shock gas volume. In addition, it is possible that a restraint element, preferably in the form of a spring, is configured in the passage formed by the propellant rings. The propellant rings may also have different thickness dimensions and/or a different chemical composition.

As an alternative to the plural propellant rings it is also possible to configure the at least one propellant element of one single propellant element, especially a monolith having a central through passage.

It is also possible that the propellant rings are formed and arranged such that for an entirety of plural propellant rings a rib-shaped structure viewed in axial cross-section having preferably U-shaped or V-shaped clearances is formed, wherein especially the thickness of the propellant rings is reduced from the outer periphery thereof toward the center thereof so that the propellant rings are preferably ignitable by the igniting unit such that hot igniting gases and/or igniting particles may be supplied to the clearances. In this way optimum ignition or firing of the propellant charge can be obtained, as the igniting gases and, resp., igniting fumes which may contain also hot particles are adapted to flow to a larger surface of the propellant charge to be ignited. Hence the rib-shaped structure and, resp., the formation of the clearances results in a larger ignitable surface of the propellant charge as compared to propellant rings arranged in planar sequence without any clearances.

Between the igniting unit and a first propellant ring of the propellant charge in the gas flow direction of the combustion chamber a filling material, preferably in annular form and preferably made of closed-pore silicone foam, may be disposed. With the aid of filling material configured in this way the gas volume available in the combustion chamber is to be displaced away from the igniter and towards the bursting element. It is a drawback in terms of energy when the igniting unit in its direct environment at first heats a gas volume. For this purpose it is of advantage to guide the energy of the igniting unit as directly as possible to the shock gas volume immediately ahead of the bursting element.

Moreover, between the bursting element and a last propellant ring of the propellant charge in the gas flow direction of the combustion chamber a preferably annular spacer may be disposed. The spacer includes a through hole in which a shock gas volume is provided. With the aid of the preferably annular spacer, an additional shock gas volume is thus formed. Along with the propellant charge and the shock gas volume delimited by the bursting element such large shock gas volume is made available which in the activated state of the hybrid inflator acts on the bursting element like a gas pressure spring.

In a preferred embodiment of the invention, the ratio of the shock gas volume to an area defined by the radius (rGVK) of the inner diameter of the gas supply chamber is larger than 1 cm, wherein: $SGV/(n*rGKV)^2)>1$ cm. Merely by way of example this relationship has to be understood to the effect that with a particular shock gas volume related to an area determined by the radius of the gas supply chamber, viz. the area $n*(rGVK)^2$, wherein "n" denotes the circle number "pi", a particular thickness as regards a shock wave package is required to initiate a robust shock wave.

In an embodiment of the invention, the bursting element is in the form of a bursting disk which is configured to be welded in a pressure-tight manner on the discharge end of the combustion chamber. In this case, in the idle state of the hybrid inflator, i.e. in its non-activated state, no pressure compensation may form between the gas supply chamber and the combustion chamber. The propellant in the combustion chamber in this case is under atmospheric pressure. In order to generate a robust shock wave, a bursting element, especially the bursting disk welded in a pressure-tight manner, and a restraint element maintaining the propellant charge in its position and preferably being in the form of a combustion chamber screen delimit a shock gas volume acting on the bursting disk like a gas pressure spring.

Furthermore, according to an independent aspect the invention relates to a vehicle safety system comprising an afore-described hybrid inflator, and airbag unit and/or a crash sensor.

Within the scope of the present invention, equally a method of forming a shock wave inside a hybrid inflator is disclosed and claimed. Preferably the method may be employed in a hybrid inflator comprising the afore-mentioned design features.

The method according to the invention comprises the following steps of:
  activating an igniting unit,
  opening a bursting element by pressing a shock gas volume formed ahead of the bursting element against the bursting element and
  generating an (intensified) shock wave in a gas supply chamber downstream of the bursting element.

In another configuration of the method according to the invention, at least one of the following (additional) steps can be carried out:
  guiding gas generated in a combustion chamber in the direction of the bursting element,
  guiding the shock gas volume into the gas supply chamber,
  igniting a propellant charge present in the combustion chamber while the gas is guided in the direction of the bursting element
  supplying hot igniting gases and/or igniting particles to clearances formed between propellant rings.

The afore-mentioned method steps are preferably carried out in the shown order, wherein the entire operation takes few milliseconds. It is a basic idea of the method according to the invention to form a shock gas volume ahead of the bursting element which, upon activation of an igniting unit, is pressed against the bursting element due to the gas generated in the combustion chamber. By reason of the opened bursting element a shock wave is formed or, resp., an already existing shock wave is guided into the gas supply chamber. The intensity of the shock wave is increased due to the shock gas volume formed so that a bursting element arranged on the end side of the gas supply chamber can be opened in a robust manner. If in the combustion chamber a shock wave has already been formed, it is intensified, due to the shock gas volume formed in the combustion chamber, in the area of the bursting element which is arranged between the combustion chamber and the gas supply chamber.

BRIEF DESCRIPTION OF THE DRAWINGS

Hereinafter the invention shall be illustrated in detail by way of embodiments with reference to the enclosed schematic Figures, in which.

DESCRIPTION

Figure 1:
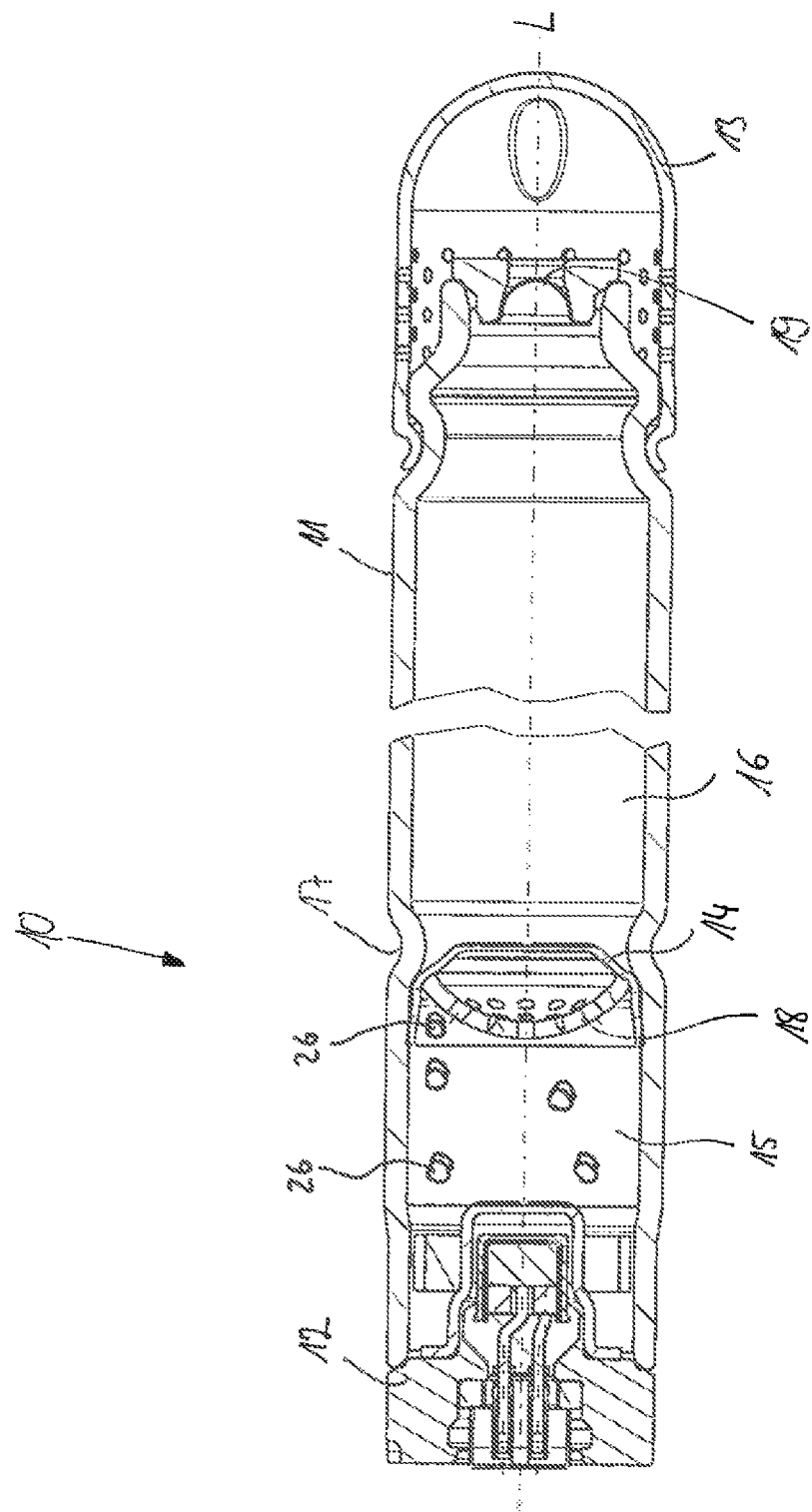
FIG. 1 shows a sectional view across a basic structure of a hybrid inflator according to the state of the art.

Hereinafter, for equal and equally acting parts the same reference numerals shall be used, wherein FIG. 1 represents the basic structure of a hybrid inflator 10. The latter includes an elongate cylindrical housing 11 forming the outer housing of the hybrid inflator 10. On the first axial end thereof an igniting unit 12 is formed, with a diffusor 13 being provided on the second axial end of the housing 11. The diffusor 13 is provided with discharge ports and is connected to the housing 11 in the axial direction and directs the discharging gas to a location of use, for example to an inflatable airbag (not shown).

A bursting element 14 divides the housing 11 into a combustion chamber 15 and a gas supply chamber 16. In the direction of the longitudinal inflator axis L the combustion chamber 15 is connected to the igniter 12 in the housing 11. In the combustion chamber 15 a predetermined quantity of propellant is present. Said propellant may be provided, for example, in the form of compressed molded bodies or propellant elements (26).

In the direction of the longitudinal inflator axis L the gas supply chamber 16 is adjacent to the combustion chamber 15. The gas supply chamber 16 is filled with gas, especially cold gas such as e.g. argon, helium or any other suitable gas mixture. The bursting element 14 does not close the gas supply chamber 16 against the combustion chamber 15 in a pressure-tight manner so that a fluid communication exists between the two chambers 15 and 16. Due to this fact, during manufacture of the hybrid inflator 10 upon filling the gas supply chamber 16 with gas, especially cold gas, said gas also flows into the combustion chamber via through holes of the bursting element 15 until pressure compensation is reached between the two chambers 15 and 16. Preferably, the pressure compensation is brought about within about 5 seconds. Hence, prior to activation of the hybrid inflator 10 compressed gas is present both in the gas supply chamber 16 and in the combustion chamber 15 in mutual fluid communication.

In the variant of a hybrid inflator 10 shown hero the bursting element 14 is press-fitted or clamped into the housing 11. The bursting element 14 may also be adhesively connected to the housing 11, however.

The housing 11 includes an annularly peripheral constriction 17 in the area in which the bursting element 14 is fastened in the housing 11. The outer surface of the bursting element 14 is adjacent to the inside of the constriction 17 so that the bursting element 14 is supported in the area of the constriction 17 and the bursting element 14 is thus additionally secured. In the case that the bursting element 14 is adhesively connected to the housing 11, the annularly peripheral constriction 17 may be dispensed with, wherein the housing 11 may include an equally continuous cylindrical shape in this area.

In order to withhold burn-up particles, for example, ahead of the bursting element 14 a restraint element 18 is configured as a combustion chamber screen in the combustion chamber 15. The curvatures of the bursting element 14 and of the restraint element 18 are configured in opposite directions.

When the hybrid inflator 10 is activated, the igniting unit 12 receives an electric signal to activate the hybrid inflator 10 and, resp., to ignite the propellant charge present in the combustion chamber 15. The ignition of the propellant charge present in the combustion chamber 15, especially of the solid propellant charge, results in sudden increase in pressure inside the combustion chamber 15 so that the bursting element 14 can be destroyed and opened, respectively. In the bursting element 14 a large opening is formed. Said abrupt opening generates a shock wave which enters the gas supply chamber 16 and passes through the same up to a bursting disk 19 arranged on the end side of the gas supply chamber. The bursting disk 19 may be replaced with a different bursting membrane or with a bursting sleeve.

In the shown embodiment of a hybrid inflator 10 the igniting unit 12, the restraint unit 18 and the bursting element 14 are located on the longitudinal hybrid inflator axis L. In this way, optimum ignition of the propellant charge provided in the combustion chamber 15 is achieved so that efficient formation and propagation of the shock wave is obtained.

The hybrid inflator 10 shown here can be used, for example, for inflating an airbag and/or can be used in a belt tensioner system.

Furthermore, it is possible that in the hybrid inflator 10 additional propellant (not shown) is received within the gas supply chamber 16 for resupplying hot gas.

Figure 2:
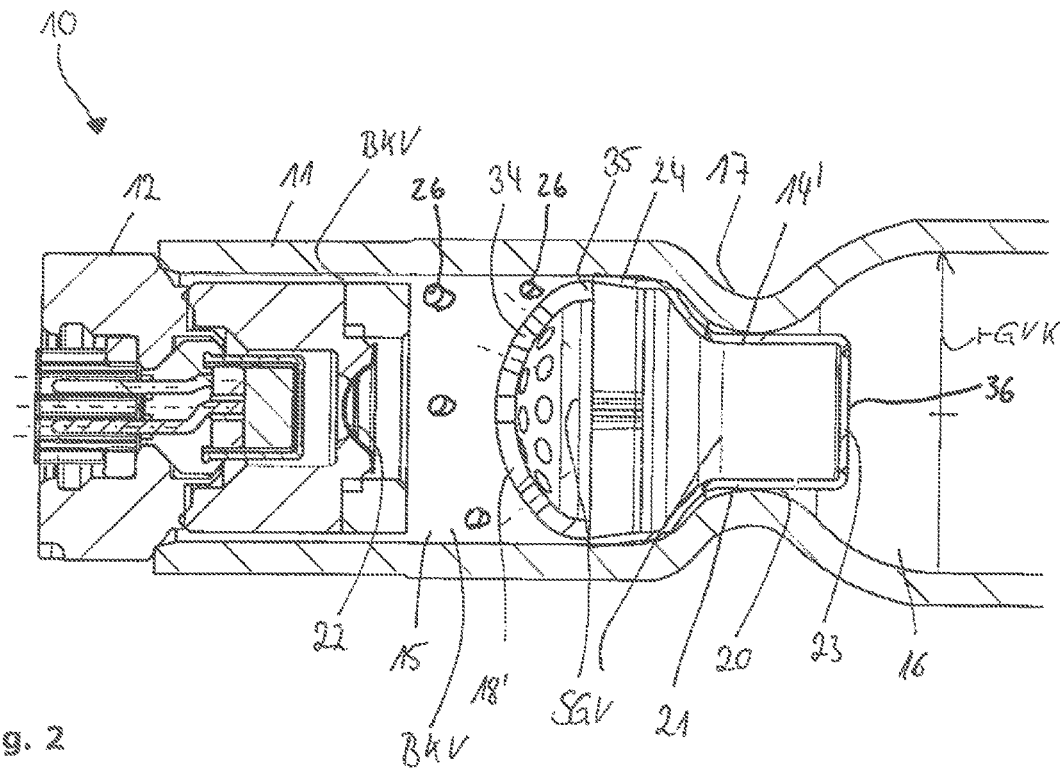
FIG. 2 shows a sectional view across a hybrid inflator according to a preferred embodiment, with the bursting element being in the form of a bursting sleeve.

FIG. 2 represents a first possible embodiment of a hybrid inflator 10 further developed according to the invention. In the combustion chamber 15 a propellant charge comprising a plurality of propellant elements 26 is arranged, wherein the propellant elements 26 may be present in the form of tablets, rings or cylindrical molded bodies having one or more passages or else in the form of granules. The combustion chamber 15 is filled with gas and includes a discharge end 20. At the discharge end 20 is formed the bursting element 14' which delimits the combustion chamber 15 at the discharge end 20 in the inactivated state of the hybrid inflator 10 against the gas supply chamber 16.

The bursting element 14' is a bursting sleeve. The peripheral wall 21 of the bursting sleeve 14" is adjacent at least in portions to the inner surface of the constriction 17. The bursting sleeve 14' is inserted into the constriction 17 and projects into the gas supply chamber 16. The bursting element 14 of FIG. 1 does not project into the gas supply chamber 16, however. Projecting into the gas supply chamber 16 of the bursting element 14' is to be understood so that the extension of the bursting element 14' protrudes from the constriction 17. The restraint element 18' maintaining the propellant charge in its position is a combustion chamber screen in the embodiment according to FIG. 2.

The bursting element 14' in the form of a bursting sleeve substantially has a flat lid 23, a cylindrical peripheral wall 21 and a fastening portion 24. The lid 23 includes an opening area 36 which is substantially arranged in the center of the lid. The fastening portion 24 is partly truncated and abuts on the inner wall of the housing 11.

The bursting element 14' and the restraint element 18' delimit a shock gas volume SGV which in the activated state of the hybrid inflator 10 acts on the bursting element 14' like a gas pressure spring. The space SGV formed by the bursting element 14' and the restraint element 18' is substantially free from burn-up particles and propellant elements so that a shock gas volume SGV is formed in this enlarged space. When the hybrid inflator 10 is activated, at first an igniter-side bursting element 22 is destroyed so that hot ignition gas and/or hot igniting particles may penetrate the combustion chamber 15. The propellant charge in the combustion chamber 15 is ignited and burnt up in this way, thus causing the pressure in the combustion chamber 15 to be increased. The gas pressure formed in this way thus presses onto the shock gas volume SGV so that the bursting element 14' is destroyed and, resp., opened. Accordingly, first the opening area 36 of the lid 23 of the bursting element 14' is opened. After that, the shock gas volume SGV flows into the gas supply chamber 16 very quickly, namely in the way of a gas pressure spring. Since the lid 23 of the bursting element 14' protrudes into the gas supply chamber 16, the shock wave is initiated at this point so that the shock wave propagates extremely quickly toward the bursting disk 19 of the hybrid inflator 10 and, resp., moves there through the gas supply chamber 16 so as to open the bursting disk 19.

Figure 3:
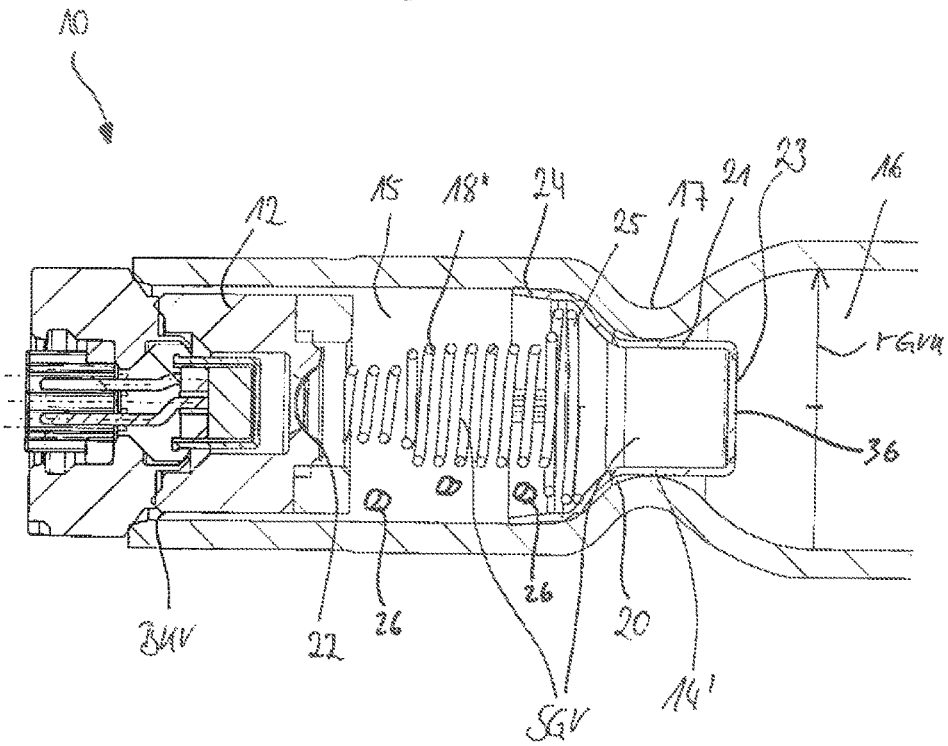
FIG. 3 shows a sectional view across a hybrid inflator according to another embodiment, with the restraint element being a spring and the bursting element being a bursting sleeve.
Figure 4:
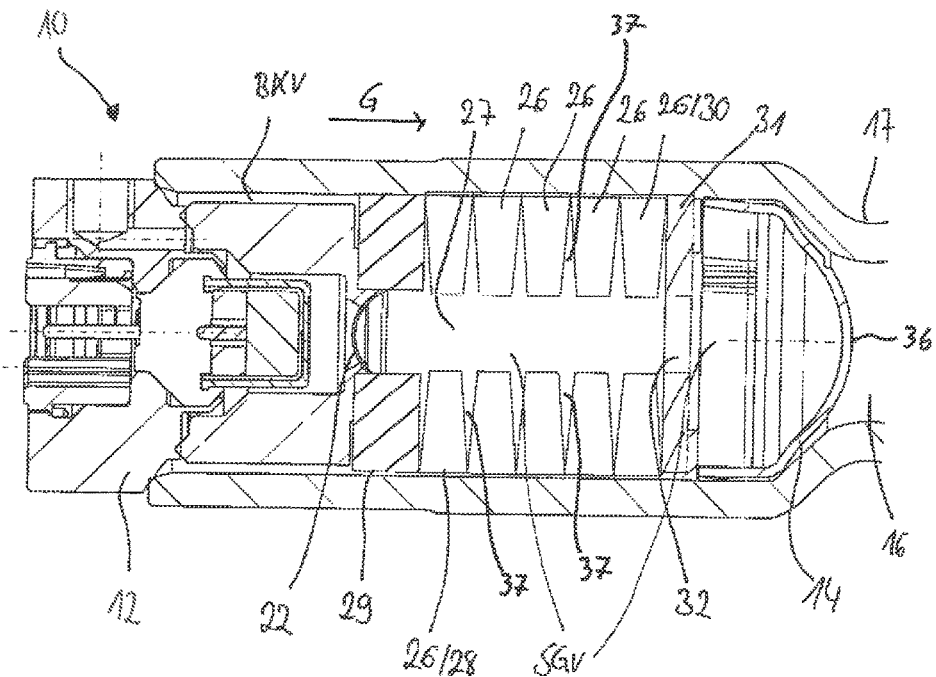
FIG. 4 shows a sectional view across a hybrid inflator according to the invention in accordance with another preferred embodiment, with the propellant charge being formed of a plurality of propellant rings.

In FIG. 3 another embodiment regarding a hybrid inflator 10 according to the invention is shown. The bursting element 14' is equally designed as bursting sleeve. In this context, the same explanations as given already in connection with the embodiment according to FIG. 2 are applicable. The restraint element 18" maintaining the propellant charge and, resp., the propellant elements 26 in its position is a spring, namely a coil spring. The right-hand end 25 as shown in FIG. 4 of the spring is inserted in the bursting element 14'. The restraint element 18' keeps a gas volume passage free inside the propellant charge. Along with the bursting element 14' the restraint element 18' delimits a shock gas volume SGV. The shock gas volume SGV is pressed against the lid 23 of the bursting element 14' upon activation of the hybrid inflator 10. The shock gas volume in the form of a shock wave package initiates an extremely intense shock wave in the gas supply chamber 16.

FIG. 4 represents another embodiment of a hybrid inflator 10 according to the invention. In the combustion chamber 15 a propellant charge is disposed, wherein the individual propellant elements 26 are in the form of propellant rings each having a central through passage. The propellant rings 26 are juxtaposed in the longitudinal hybrid inflator axis L so that in total a passage 27 is formed. Said passage 27 is regarded as part of the shock gas volume SGV to be formed. The arrangement of the propellant rings 26 and of the bursting element 14, which is a simple bursting membrane, delimit a shock gas volume SGV acting on the bursting element 14 like a gas pressure spring in the activated state of the hybrid inflator 10.

The propellant rings 26 are configured and arranged so that for an entirety of plural propellant rings 26 a rib-shaped structure viewed in the axial cross-section having preferably U-shaped or V-shaped clearances 37 is formed. Accordingly, the thickness of the propellant rings 26 decreases from the outer periphery thereof toward the center thereof. Upon activation of the hybrid inflator 10 the propellant rings 26 can be ignited by the igniting unit 12 so that hot igniting gases and/or igniting particles are supplied to the clearances 37.

As an alternative to the individual propellant elements 26, one single propellant ring (not shown) may be provided in the form of a monolith having a central through passage which may be designed to have a corresponding longitudinal extension, so-to-speak in exchange for a sequence of the individual propellant rings 26.

Between the igniting unit 12 and a first propellant ring 28 in the gas flow direction G of the combustion chamber 15 an annularly designed filling material 29 is disposed. Said filling material 29 preferably is made of closed-pore silicone foam. The filling material 29 causes the shock gas volume SGV available in total in the combustion chamber 15 to be displaced away from the igniting unit 12 and to be displaced in the direction of the bursting element 14. It would be a drawback in terms of energy when the igniting unit 12 initially would have to heat a gas volume in its direct environment, viz. in the area of the filling material 29. Instead, the energy of the igniting unit 12 may be guided directly to the shock gas volume SGV ahead of the bursting element 14.

A spacer 31 is formed between the bursting element 14 and a last propellant ring 30 in the gas flow direction G of the combustion chamber 15. With the aid of the spacer 31, especially with the aid of the passage 32, a larger shock gas volume SGV is formed. In the area of the spacer 31 the gas does not have to ignite any propellant charge.

Figure 5:
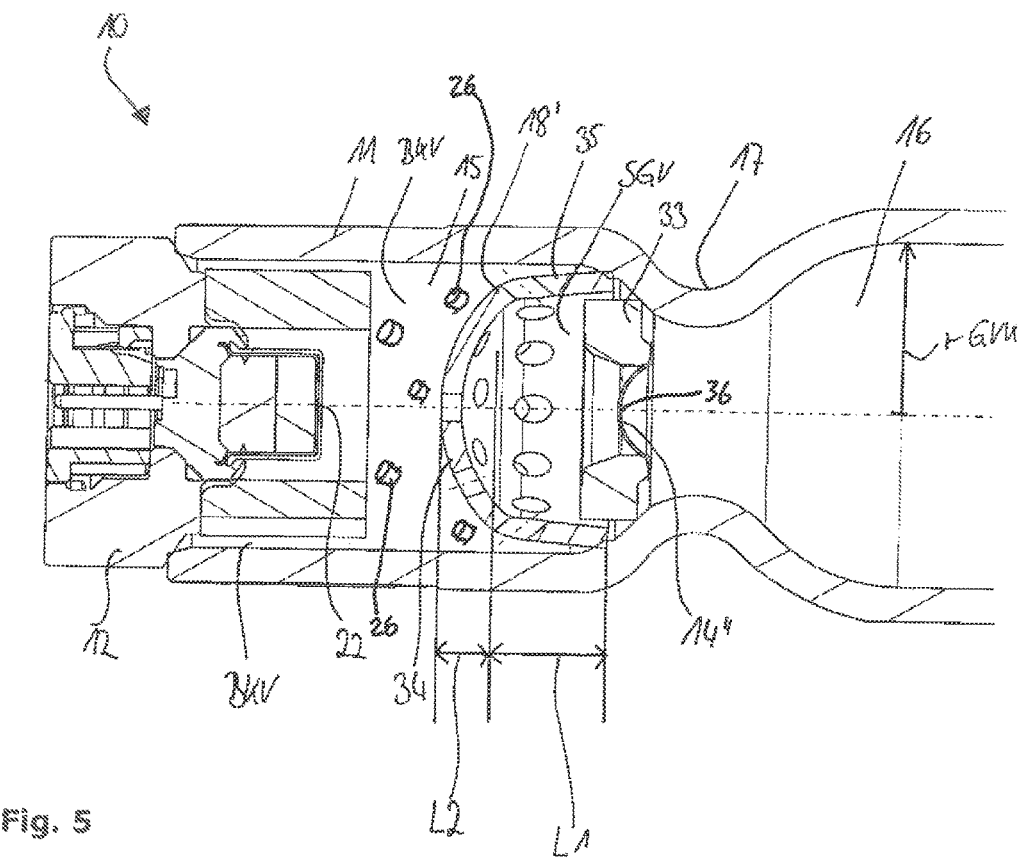
FIG. 5 shows a sectional view across a hybrid inflator according to the invention in accordance with another preferred embodiment, with the bursting element being connected, especially welded, to the hybrid inflator housing in a pressure-tight manner.

In FIG. 5 a hybrid inflator 10 according to the invention is shown, with the propellant charge or the propellant elements 26 in the combustion chamber 15 being under atmospheric pressure, i.e. not being surrounded by the compressed gas of the biased gas supply chamber 16. The bursting element 14" is a bursting disk which is welded in a pressure-tight manner to the housing 11 of the hybrid inflator 10 with the aid of a bursting element support 33. The restraint element 18' is configured as a combustion chamber screen having a universal ball joint-type portion 34 as well as a peripheral wall 35. The peripheral wall 35 is arranged to point toward the bursting element 14" and includes a hollow truncated portion. In the shown example, the peripheral wall 35 has a longitudinal extension L1 corresponding to 1.5 times the longitudinal extension L2 of the universal ball joint-type portion 34. Due to the large longitudinal extension L1 of the peripheral wall 35, the bursting element 14" and the restraint element 18' delimit an appropriately large shock gas volume SGV which in the activated state of the hybrid inflator 10 acts on the bursting element 14" like a gas pressure spring.

In the shown example according to FIG. 5, the shock gas volume SGV may act on the bursting element 14" so that the bursting element 14" can be opened by such great force that the shock wave may propagate into the gas supply chamber 16 and a bursting disk 19 (not shown here) may be opened in a robust way.

It is also imaginable that the combustion chamber 15 is completely free from any propellant charge. In this case the entire free combustion chamber volume can be regarded as shock gas volume (SGV) which acts on the bursting element 14, 14', 14" like a gas pressure spring upon activation of the hybrid inflator 10.

It is applicable to all shown embodiments according to FIGS. 2 to 5 that the ratio of the shock gas volume SGV to the entire empty volume of the combustion chamber BKV is at least 0.25, preferably 0.35, especially preferred 0.45. Empty volume of the combustion chamber BKV is to be understood as the empty volume of the combustion chamber which is formed without any combustion chamber fittings and without any propellant charge. The empty volume of the combustion chamber BKV thus reaches from the igniter-side end of the combustion chamber (without igniter unit) to the constriction 17 and, resp., to the transition to the gas supply chamber 16.

Moreover, it is possible with respect to all embodiments according to FIGS. 2 to 5, that the ratio of the shock gas volume SGV to an area defined by the radius (rGVK) of the inner diameter of the gas supply chamber 16 is larger than 1 cm, wherein: $SGV/(n*(rGVK)^2) > 1$ cm. Merely by way of example, this connection has to be understood to the effect that with a particular shock gas volume SGV related to an area determined by the radius rGVK of the gas supply chamber 16, viz. the area $n*(rGVK)^2$, with "n" being the circle number "pi", a certain thickness as regards a shock wave package is required to initiate a robust shock wave.

LIST OF REFERENCE NUMERALS 10 hybrid inflator
11 housing
12 igniting unit
13 diffusor
14, 14', 14" bursting element
15 combustion chamber
16 gas supply chamber
17 constriction
18, 18', 18" restraint element
19 bursting disk
20 discharge end
21 peripheral wall
22 igniter-side bursting element
23 lid
24 fastening portion
25 end of spring
26 propellant ring/propellant element
27 passage
28 first propellant ring
29 filling material
30 last propellant ring
31 spacer
32 passage
33 bursting element support
34 universal ball joint-type portion
35 peripheral wall
36 opening area
37 clearance
G gas flow direction
L longitudinal hybrid inflator axis
L1 longitudinal extension of peripheral wall
L2 longitudinal extension of universal ball joint-type portion
SGV shock gas volume
BKV empty volume of combustion chamber
rGVK radius of gas supply chamber
Lfrei length of free space

The invention claimed is:

1. A hybrid inflator (10) comprising:
an outer housing (11) having a first axial end and a second axial end;
an igniting unit (12) by which a propellant charge, which is formed of at least one propellant element (26), can be ignited, the igniting unit (12) being formed on the first axial end of the outer housing (11); and
a bursting element (14, 14', 14") being attached to the outer housing (11), the bursting element (14, 14', 14"), in an inactivated state of the hybrid inflator (10), dividing the outer housing (11) into a combustion chamber (15) having the propellant charge arranged therein and a gas supply chamber (16) being filled with a gas, the bursting element (14) having an opening area (36); wherein
the combustion chamber (15) extends in a direction of a longitudinal inflator axis (L) from the first axial end of the outer housing (11) to the opening area (36) of the bursting element (14, 14', 14"), the extension of the combustion chamber (15) defining a total empty volume of the combustion chamber (BKV); and
the bursting element (14, 14', 14") and at least one of the propellant charge and a restraint element (18, 18', 18"), which maintains the propellant charge in its position, delimit a shock gas volume (SGV) which, in the inactivated state of the hybrid inflator (10), is formed spatially ahead of the bursting element (18, 18', 18") and, in an activated state of the hybrid inflator (10), acts on the bursting element (14, 14', 14") to open the opening area (36), an area in which the shock gas volume (SGV) is formed being substantially free from any propellant charge, a ratio of the shock gas volume (SGV) to the total empty volume of the combustion chamber (BKV) being at least 0.35.

2. The hybrid inflator (10) according to claim 1, wherein between the opening area (36) and the igniting unit (12) the propellant charge is arranged so that the shock gas volume (SGV) is configured free from propellant charge and has an axial length, which is parallel to the longitudinal inflator axis (L), that ranges from 9 mm to at least 40 mm.

3. The hybrid inflator (10) according to claim 1, wherein the ratio of the shock gas volume (SGV) to the total empty volume of the combustion chamber (BKV) is at least 0.45.

4. The hybrid inflator (10) according to claim 1, wherein the restraint element (18, 18', 18") is a combustion chamber screen (18') having a peripheral wall (35) arranged in the combustion chamber (15) and a universal ball joint-shaped portion (34) connected to an igniting unit facing end of the peripheral wall (35), the peripheral wall (35) having one of a hollow-cylindrical portion, a hollow truncated portion, and a hollow truncated pyramid portion.

5. The hybrid inflator according to claim 4, wherein the peripheral wall (35) has a longitudinal extension (L1) and the universal ball joint-shaped portion (34) has a longitudinal extension (L2), the longitudinal extension (L1) of the peripheral wall (35) being 1.2-2.5 times longer than the longitudinal extension (L2) of the universal ball joint-shaped portion (34).

6. The hybrid inflator according to claim 4, wherein the bursting element (14, 14', 14") is a bursting disk (14") that is attached to the outer housing (11) in a pressure-tight manner so that gas from the gas supply chamber (16) is unable to pass into the combustion chamber (15) through the bursting disk (14") and that the propellant charge in the combustion chamber (15) is under atmospheric pressure, the bursting disk (14") and the combustion chamber screen (18') delimiting the shock gas volume (SGV).

7. The hybrid inflator (10) according to claim 1, wherein the restraint element (18, 18', 18") is a spring (18") that has a first end (25) arranged in the bursting element (14, 14', 14"), the spring (18") projecting from the bursting element (14, 14', 14") and toward the igniting unit (12) so that a second end of the spring (18") is spaced from the bursting element (14, 14', 14"), an interior of the spring (18") forming a passage that delimits the shock gas volume (SGV) together with the bursting element (14, 14', 14").

8. The hybrid inflator (10) according to claim 1, wherein the at least one propellant element (26) is in the form of a plurality of propellant rings (26), each of the propellant rings (26) having a central through passage, the propellant rings (26) being arranged in parallel in the combustion chamber (15) so that an alignment of the central through passages forms a passage (27) that together with the bursting element (14, 14', 14") delimits the shock gas volume (SGV).

9. The hybrid inflator (10) according to claim 8, wherein the propellant rings (26) are designed and arranged so that for an entirety of plural propellant rings (26) a rib-shaped structure, viewed in an axial cross-section, having U-shaped or V-shaped clearances (37) is formed, a thickness of the propellant rings (26) being reduced from an outer periphery thereof toward a center thereof so that the propellant rings (26) can be ignited by the igniting unit (12) so that hot igniting gases and/or igniting particles can be supplied to the clearances (37).

10. The hybrid inflator (10) according to claim 8, wherein between the igniting unit (12) and a first propellant ring (28) of the propellant rings (26) in a gas flow direction (G) of the combustion chamber (15), an annular filling material (29) is arranged, and between the bursting element (14, 14', 14") and a last propellant ring (30) of the propellant rings (26) in the gas flow direction (G) of the combustion chamber (15), an annular spacer (31) is arranged, the annular spacer (31) having a passage (32) that together with the bursting element (14, 14', 14") and the passage (27) formed through the plurality of propellant rings (26) delimits the shock gas volume (SGV).

11. The hybrid inflator (10) according to claim 1, wherein a ratio of the shock gas volume (SGV) to an area $(n*(rGVK)^2)$ defined by a radius (rGVK) of an inner diameter of the gas supply chamber (16) is larger than 1 cm.

12. A vehicle safety system comprising a hybrid inflator (10) according to claim 1, an airbag unit and/or a crash sensor.

13. A method of forming a shock wave inside a hybrid inflator (10) according to claim 1, the method comprising the following steps of:
activating the igniting unit (12),
opening the opening area (36) of the bursting element (14, 14', 14") by pressing the shock gas volume (SGV) formed ahead of the bursting element (14, 14', 14") against the bursting element (14, 14', 14"), and
generating a shock wave in the gas supply chamber (16) downstream of the bursting element (14, 14', 14").

14. The method according to claim 13, wherein at least one of the following further steps of:
guiding gas generated in the combustion chamber (15) in the direction of the bursting element (14, 14', 14"),
guiding the shock gas volume (SGV) into the gas supply chamber (16),
igniting the propellant charge present in the combustion chamber (15), while the gas is guided in the direction of the bursting element (14, 14', 14"),
supplying hot igniting gases and/or igniting particles to clearances (37) formed between propellant rings (26).

15. The hybrid inflator according to claim 1, wherein the outer housing (11) has a constriction (17) formed between the combustion chamber (15) and the gas supply chamber (16), the bursting element (14, 14', 14"), which is in the form of a bursting sleeve (14'), being inserted in the constriction (17), the busting sleeve (14') having a flat lid (23) with the opening area (36), a cylindrical peripheral wall (21) that is at least partially adjacent to an inner surface of the constriction (17), and a fastening portion (24) that is positioned in the combustion chamber (15) and abuts an inner wall of the outer housing (11), at least a portion of the peripheral wall (21) protruding in the direction of the longitudinal inflator axis (L) from the constricting (17) into the gas supply chamber (16) so that the flat lid (23) is positioned in the gas supply chamber (16).

16. The hybrid inflator (10) according to claim 15, wherein the restraint element (18, 18', 18") is a combustion chamber screen (18') having a peripheral wall (35) arranged in the combustion chamber (15) and a universal ball joint-shaped portion (34) connected to an igniting unit facing end of the peripheral wall (35), a gas supply chamber facing end of the peripheral wall (35) being connected to an igniting unit facing end of the bursting sleeve (14') so that the combustion chamber screen (18') projects in the direction of the longitudinal inflator axis (L) from the igniting unit facing end of the bursting sleeve (14') toward the igniting unit (12), the bursting sleeve (14') and the combustion chamber screen (18') delimiting the shock gas volume (SGV).

17. The hybrid inflator (10) according to claim 1, wherein the bursting element (14, 14') allows a fluid communication between the gas supply chamber (16) and the combustion chamber (15) so that gas from the gas supply chamber (16) is capable of flowing into the combustion chamber (15).

18. The hybrid inflator (10) according to claim 1, wherein when the igniting unit (12) is activated, the propellant charge is ignited and burnt to increase gas pressure in the combustion chamber (15), the gas pressure formed by the burnt propellant charge presses on the shock gas volume (SGV) to cause the shock gas volume (SGV) to act on the bursting element (14, 14', 14") to abruptly open the opening area (36), the abrupt opening of the opening area (36) generates a shock wave which enters and moves through the gas supply chamber (16) in the direction of the longitudinal inflator axis (L).

19. The hybrid inflator (10) according to claim 1, wherein the gas supply chamber (16) extends in the direction of the longitudinal inflator axis (L) from the combustion chamber (15) to the second axial end of the outer housing (11).

20. The hybrid inflator (10) according to claim 1, wherein the combustion chamber (15) is connected to the igniting unit (12) in the outer housing (11), and wherein the total empty volume of the combustion chamber (BKV) is a volume of the combustion chamber that extends from the first axial end of the outer housing (11) to the opening area (36) of the bursting element (14, 14', 14") without the igniting unit (12), any propellant charge, and any combustion chamber fittings.

* * * * *